United States Patent [19]

Serata

[11] 4,305,299
[45] Dec. 15, 1981

[54] MICRO-CREEPMETER

[76] Inventor: Shosei Serata, 1229 - 8th St., Berkeley, Calif. 94710

[21] Appl. No.: 143,835

[22] Filed: Apr. 25, 1980

[51] Int. Cl.³ ............................................. G01B 11/16
[52] U.S. Cl. ...................................... 73/779; 73/784; 73/786
[58] Field of Search ................. 73/779, 784, 786, 781, 73/789, 787, 658; 33/1 H, 1 HH

[56] References Cited

U.S. PATENT DOCUMENTS

| 2,814,883 | 12/1957 | Strimel | 73/779 |
| 4,094,189 | 6/1978 | Serata | 73/779 |

FOREIGN PATENT DOCUMENTS 52-20078  2/1977  Japan .

Primary Examiner—Anthony V. Ciarlante
Attorney, Agent, or Firm—Harris Zimmerman; Howard Cohen

[57] ABSTRACT

A device for determining microscopic motion in static creep and dynamic oscillation between two objects by measuring relative displacement between the two objects connected by a metal wire includes a linear variable differential transformer disposed within a cylindrical housing. One end of the housing includes an extendable tubular member which is joined to one of the objects. The other end of the housing includes a fitting for securing a wire extending to the other object. The core of the linear variable displacement transformer is supported by a pair of spider diaphragms disposed on opposite sides of the transformer. The tubular member is connected by an extension spring to one of the diaphragms, while the wire retaining fitting is connected by a universal joint to the other diaphragm. The diaphragms provide high axial compliance so that the core may undergo microscopic displacement in concert with the displacement between the two objects.

21 Claims, 7 Drawing Figures

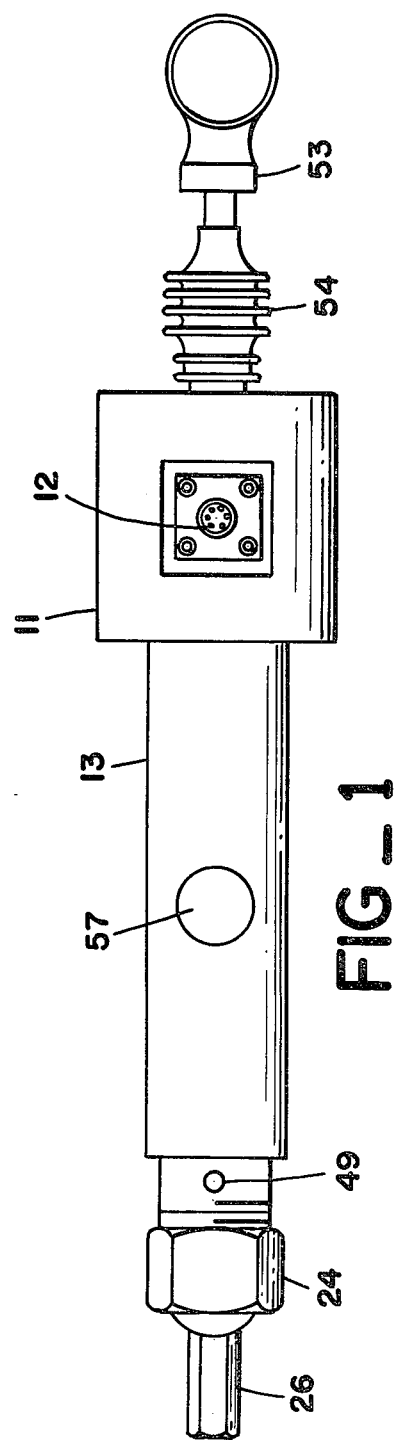
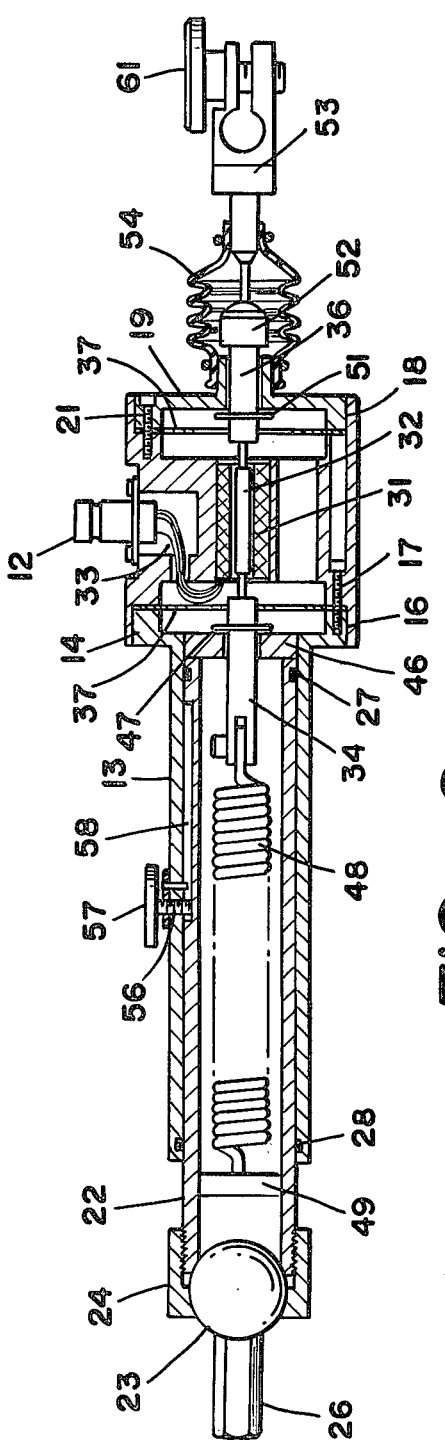

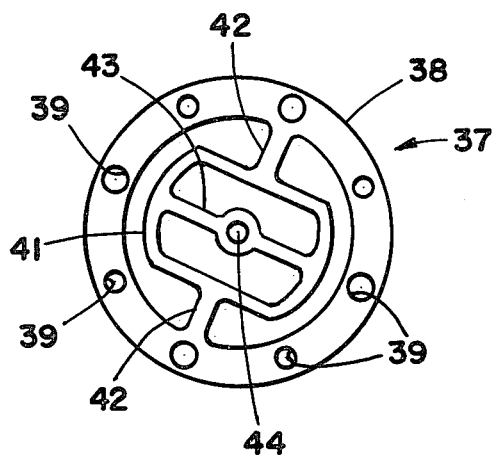
FIG_3
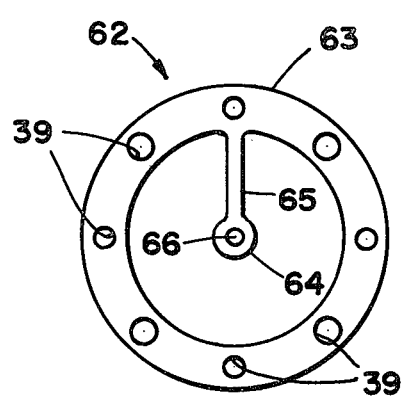
FIG_4a
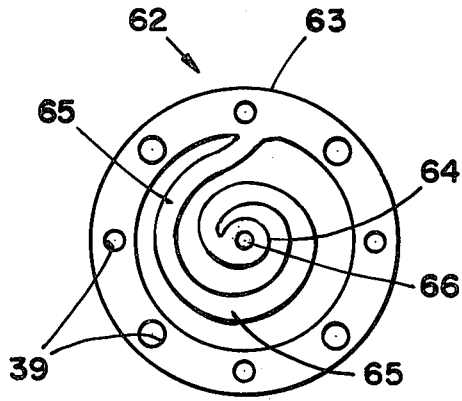
FIG_4b
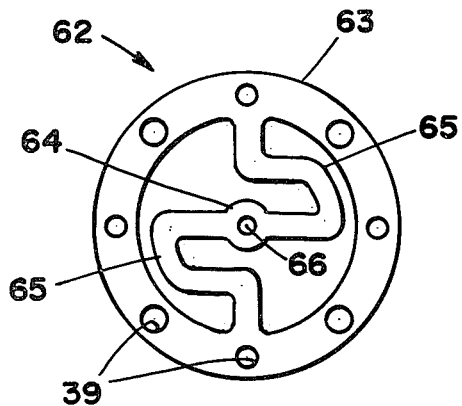
FIG_4c
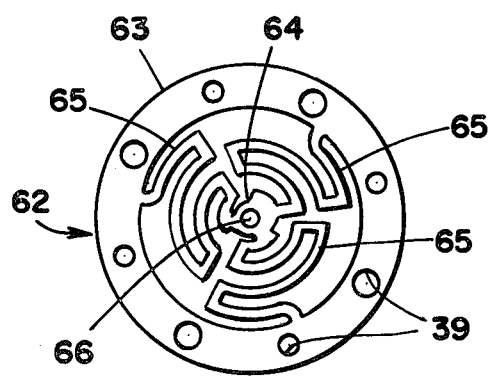
FIG_4d

MICRO-CREEPMETER

BACKGROUND OF THE INVENTION

In the general field of earth structures such as open pit slopes, tailngs, dams, foundation work, tunnel excavations, underground mines, building foundations, and the like, it is well known that stresses within the earth's media surrounding the structure or within the structure itself may exceed the structure's strength and cause a failure. If there is no warning of such a failure, the consequences may be catastrophic, especially in terms of of the loss of lives of workers caught in a collapsing earthen structure. It is known, at least theoretically, that such failures do not occur without tell-tale prior warning signals. That is, as the structures within an earth medium approach the critical maximum strength or the critical dynamic strength of the materials, the structure begins to deform by static creep or microseismic oscillation long before catastrophic failure. Although the magnitude of such creep deformation or oscillation motion is quite small compared with the movement which occurs during a failure, it can be measured. Measurements of the magnitude and direction of the microscopic creep deformation and the nature of micro-seismic activities disclose the existence of a potential failure, as well as the nature and cause of the potential failure. With quantitative knowledge of the micro-creep and micro-seismic behaviors, the potential failure may be predicted, and consequently necessary measures may be taken to avert such a failure. The technological realization of this theoretical knowledge has been less than optimum to date, as witnessed by the many mine cave-ins, slope failures, dam failures, and the like throughout the world. This is due in part to the fact that micro-creep deformation and micro-seismic activities, prior to failure, are quite small. Existing state of the art devices for measuring creep deformation and seismic oscillation in field conditions have a limited sensitivity, and an inherent hysteresis error, and thus require a rather long time period to develop significant data regarding the nature and magnitude of the ground creep deformation. They are also not capable of monitoring micro-seismic oscillation with an accuracy better than 10-6 inches. In situations such as advanced tunnel excavations or underground mining, or open-pit mining, the prior art creep measuring devices often cannot be set up for a sufficient time to gain significant data, as they commonly interfere with construction or mining activity. Economic considerations dictate that these devices will be set aside in favor of maintaining mine ouput or excavation progress. In the case of earthquake hazard prediction, the devices are generally inadequate to provide direct dynamic strain measurement.

An exception to these generalizations regarding the prior art is a micro-creepmeter disclosed in U.S. Pat. No. 4,094,189, issued June 13, 1978, to Shosei Serata. This device is capable of measuring micro-creep deformation between two objects with a maximum accuracy in the order of 10-6 inches. The present invention comprises a substantial improvement over this patented instrument.

SUMMARY OF THE PRESENT INVENTION

The present invention generally comprises an improved creepmeter of novel construction which yields improved creep displacement measuring resolution due to its virtual elimination of hysteresis errors in the measuring apparatus. This elimination of hysteresis error makes the present invention also applicable to microseismic strain measurement. The present invention is also capable of withstanding greater environmental punishments without adversely affecting the readings of the instrument, due to the simple and elegant construction of the invention.

The present invention includes a linear variable differential transformer secured within a generally cylindrical housing. The core of the transformer is axially displaceable with respect to the coil of the transformer, and is supported at each end by a spider diaphragm. A tubular member is extendable from one end of the instrument, and is joined to one end of the transformer core by a helical tension spring. The other end of the transformer core is connected by a universal joint assembly to a fitting which is adapted to secure a wire. The device is adapted to measure relative displacement on a microscopic scale between two spaced-apart objects. The extendable tubular member is joined to one of the objects by a ball joint assembly which is anchored in the object itself. An anchor is secured to the other object and a wire extends from the anchor to the wire retaining fitting of the device. The tension in the wire is dynamically balanced with the tension in the helical spring, and in this dynamically balanced condition the transformer core is automatically centered in the transformer core. This arrangement permits fast set-up of the instrument regardless of wire tension applied and provides a means for fine adjustment of the instrument quickly.

The housing of the present invention is completely sealed against instrusion of environmental agents, such as dust, water, sand, and the like. Also, it should be noted that the instrument does not employ bearings, and does not require the use of parts moving in close tolerances. Thus, the possibility of contaminating the instrument by environmental agents is virtually eliminated.

BRIEF DESCRIPTION OF THE DRAWING

FIG. 1 is a plan view of the improved micro-creepmeter of the present invention.

FIG. 2 is a longitudinal cross-sectional elevation of the improved micro-creepmeter of the present invention.

FIG. 3 is a plan view of the spider diaphgram support of the improved micro-creepmeter.

FIGS. 4a–4d is an illustration of four alternative diaphragm designs in addition to the spider diaphragm design of the improved micro-creepmeter.

DESCRIPTION OF THE PREFERRED EMBODIMENT

The present invention generally comprises an improved micro-creepmeter for measuring microscopic displacement between spaced apart objects. The improved micro-creepmeter includes a measuring structure which virtually eliminates hysteresis errors introduced by the use of ball bearings and sliding memebers in previous designs. The invention also includes a novel structural arrangement which increases the ability of the instrument to withstand hostile environmental conditions.

As shown in FIG. 1, the improved micro-creepmeter includes a generally cylindrical housing 11 from which an output signal connector 12 extends in generally radial fashion. The instrument also includes a longitudinally extending cylindrical member 13 which is provided with an outwardly extending flange portion 14 at one end thereof. The flange portion 14 is received within suitably dimensioned recess 16 in one end of the housing 11. A plurality of screws 17 extend from the housing into the flange portion 14 to secure the member 13 to the housing. The other end of the housing 11 includes a recess 18 which is dimensioned to receive an end cap 19 therein. The end cap 19 is secured in the recess 18 by a plurality of screws 21 spaced circumferentially about the end of the housing.

An extendable tubular member 22 is disposed within the cylindrical member 13; a ball and socket assembly 23 is secured by a threaded collar 24 to the distal end of the tubular member 22. An anchoring stud 26 extends from the ball, and is adapted to be anchored in one of the objects from which displacement is to be measured. The proximal end of the tubular member 22 includes an O-ring seal 27 impinging on the interior bore of the cylindrical member 13. The distal end of the cylindrical member 13 also includes an O-ring seal 28 which impinges on the outer surfaces of the tubular member 22. The combined action of the two O-ring seals 27 and 28, together with the limited axial translation required of the member 22, assures that environmental comtaminants cannot enter the instrument therethrough.

The improved micro-creepmeter also includes a linear variable differential transformer (LVDT) centrally disposed and axially aligned within the housing 11. The LVDT includes outer windings 31 and an axially translatable ferromagentic core 32 disposed concentrically therein. As is known in the prior art, the position of the core 32 affects the magnetic coupling of the windings 31 so that microscopic movements of the core 32 produce a palpable variation in the output signal of the windings 31. The coils 31 are connected to the output connector 12 by internal wire 33.

One end of the LVDT core 32 is connected to a rod 34 which extends toward the cylindrical member 13. The other end of the LVDT core is connected to a rod 36 which extends toward the end cap 19.

The proximal ends of each of the rods 34 and 36 are supported by a pair of spider-like diaphragm support members 37. As shown in FIG. 3, each of the diaphragm support members 37 includes an outer annular portion 38 which is secured to the housing by the clamping action of the flange 14 or the end cap 19 in their respective recesses in the housing 11. A plurality of holes 39 extend through the annular portion 38 and are spaced thereabout to receive the screws 17 or 21 therethrough.

The spider-like central portion 41 of the support member 37 includes a pair of diametrically opposed arms 42 which extend to the outer annular portion 38. The central portion 41 includes a diametrically disposed support beam 43 having an axially disposed aperture 44 extending therethrough. The aperture 44 receives and supports the proximal end of the rod 34 or the rod 36. The diaphragm support member 37 is substantially planar, and the central portion 41 is provided wih a high compliance in the axial direction of the instrument to accommodate the axial displacements of the LVDT core 32 with virtually no hysteresis loss. It may be appreciated that the central portion 41 exhibits substantial stiffness in directions transverse to the axis of the intrument, so that the proximal ends of the rods 34 and 36 are firmly supported in directions transverse to the axis of the instrument, thus any possibility of misalignment of the LVDT core is eliminated.

Disposed in the proximal end of the cylindrical member 13 is a cylindrical block 46. The block 46 includes an axially disposed passage through which the rod 34 extends. A snap ring 47 is secured about the rod 34 proximally with respect to the block 46 to limit the translation of the rod 34. The block 46 also serves to limit the inward movement of the extendable tubular member 22. The distal end of the rod 34 is joined to one end of a helical tension spring 48. The distal end of the spring is anchored to a post 49 which is secured in the distal end of the member 22. It should be noted that the rod 34 extends through the passage in the cylindrical block 46 in freely translating fashion.

A snap ring 51 is secured about the proximal portion of the rod 36, and is adapted to impinge on the end cap 19 to limit the outward translation of the rod 36. The distal end of the rod 36 includes a ball and socket assembly 52, the shank of the ball portion extending to join a wire retaining fitting 53. A flexible accordion boot 54 is secured about the neck of the end cap 19 through which the rod 36 extends in freely translating fashion. The boot 54 is also joined to the proximal end of the fitting 53, and is provided to exclude the intrusion of environmental agents into the instrument.

The invention also includes a threaded shaft 56 secured in an appropriately threaded hole in a medial portion of the cylindrical member 13. The outer end of the shaft 56 is joined to a knurled knob 57, while the inner end of the shaft extends into a groove 58 which extends longitudinally in the tubular member 22 from a proximal portion to a medial portion thereof. Using the knob 57, the shaft 56 may be threaded outwardly to permit unfettered translation of the tubular member 22 in the cylindrical member 13. However, the shaft 56 may be threaded inwardly to impinge on the inner surface of the groove 58 and, by virtue of its frictional engagement, prevent relative translation of the members 13 and 22.

To employ the instrument of the present invention to measure microscopic displacement between two objects, the shaft 56 is threaded outwardly to permit extension of the tubular member 22. The member 22 is manually translated otwardly a certain amount to create a selected amount of tension in the spring 48. The shaft 56 is then threaded inwardly to immobilize the tubular member 22 in its extended position. It may be noted that the snap ring 47 prevents the tension in the spring 48 from pulling the LVDT core 32 from its centered disposition within transformer windings 31.

The anchoring stud 26 is then anchored to one of the objects by any means known in the prior art. Another anchor is secured in the other object, and a wire is secured to the anchor and extended to the instrument. The wire is drawn through the fitting 53, and is pulled taut until the tension in the wire is dynamically balanced with the tension in the spring 48. At this point the LVDT core 32 will be disposed in the center, or zeroed position within the transformer. Here again, it may be noted that the snap ring 51 prevents tension in the wire extending from the fitting 53 from withdrawing the core 32 from the transformer windings 31. When the zero positioning of the core is attained, the knob 61 of the fitting 53 is tightened to immobilize the wire in the fitting. It may also be appreciated that the ball and socket assembly 24 and the ball and socket assembly 52 accommodate any misalignment between the wire, the instrument, and the anchor to which member 26 is secured.

To obtain measurements after the set up steps described in the foregoing, the shaft 56 is released from its frictional engagement in the groove 58 by rotating the knob 57. The cylindrical member 13 and indeed the housing 11 is then freed to translate with respect to the tubular member 22, which in turn is fixed with respect to the anchoring member 26. The instrument is maintained in this disposition for a short time to permit all dynamic conditions to equilibrate. The shaft 56 is then tightened to secure the housing to the tubular member 22. Thenceforth, any relative motion between the two objects will cause the core 32 to translate with respect to the transformer windings 31, due to the fact that the transformer windings 31 are, in effect, immobilized with respect to the member 26, while the core 32 is connected directly to the other object by the wire extending therebetween.

With reference to FIGS. 4a–4d, the present invention also includes four alternative embodiments of the diaphragm support member 37. In each of the alternative embodiments, the diaphragm support member 62 includes an outer annular portion 63 which is substantially the same as the portion 38 of member 37. Likewise, the holes 39 are spaced about therein to accommodate the screws 17 and 21. Extending inwardly from the portion 63 is at least one arm member 65 which is joined at its inner end to a concentrically disposed annulus 64. The annulus 64 includes an aperture 66 extending axially therethrough to receive either of the rods 34 or 36 therethrough. In FIG. 4a the arm member extends linearly radially inwardly, while the arm shown in FIG. 4b describes a more circuitous, serpentine shape. The embodiment of FIG. 4c includes a pair of symmetrically opposed S shaped arm members, and the embodiment of FIG. 4d employs a trio of S members joined at the inner annulus.

Although the illustrated diaphragms are different in appearance, their basic functions are essentially the same: to hold the LVDT core along the central axis of the transformer winding while allowing free translational motion of the LVDT core in the axial direction but not in the radial direction. The longer are the arm members, the greater is the degree of compliance, accuracy and flexibility. The use of a plurality of arms, as shown in FIGS. 4c and 4d provides a better alignment of the LVDT core along the central axis of the transformer winding. of the rods 34 or 36 therethrough.

The S configuration of the members 65 provides an exceptionally long beam length between the outer annulus 63 and the inner annulus 64. As a result, the configuration of the diaphragm support member 62 shown in FIG. 4b–d provides extremely high compliance with the movement of the core 32, while retaining the support and centering functions of the embodiment discussed previously. The diaphragm support member 62 thus further decreases hysteresis error in measurements of micro-creep and micro-creep velocity.

As described in the foregoing, the snap rings 47 and 51 limit the translational range of the LVDT core 32 to approximately plus or minus 1.35 millimeters. The snap rings maintain the core within the linear variable range of the transformer and also greatly facilitate the zeroing of the instrument prior to taking readings. Also, the diaphragm support members (any embodiment) are employed in place of sealed bearings, critical clearance members, and the like which introduce some frictional hysteresis losses. As a result, the present invention exhibits a measureable hysteresis error of less than $2 \times 10^{-6}$ inch, compared to a hysteresis loss of plus or minus 50–250 microinches in the best instrument known in the prior art. The readings obtained with the present instrument are thus far more useful in measuring both microcreep displacement and dynamic oscillation in earthen structures with the accuracy limited by the accuracy of the electronic readout system of the instrument only.

I claim:

1. A device for quickly and accurately determining microscopic motion in both static creep and dynamic oscillation by accurately measuring relative displacement between two objects comprising a housing, a linear variable differential transformer secured within said housing and including a translatable core, a first member translatably extendable from said housing, first anchor means for securing said extendable member to one of said objects, elastic tensioning means secured between said extendable member and one end of said core, means for releasably securing said housing to said extendable member for movement in concert therewith, and second anchoring means for securing the other end of said core to the other of said objects.

2. The device of claim 1, further including diaphragm means for supporting said ends of said core.

3. The device of claim 2, wherein said diaphragm means includes a pair of diaphragms, one disposed at each of said ends of said core.

4. The device of claim 3, wherein each of said diaphragms includes an outer annulus having a large diameter hole extending axially therethrough, at least one support arm extending inwardly from said outer annulus, and a central web portion joined to the inner ends of said support arm.

5. The device of claim 4, wherein said outer annulus, said support arm, and said central web portion are disposed in a common plane.

6. The device of claim 4, wherein said central web portion includes a hole extending anxially theretrhough to receive one end of said core.

7. The device of claim 4, wherein said support arm includes a serpentine configuration having a plurality of lobes.

8. The device of claim 7, wherein said support arm, outer annulus, and central web portion are disposed in a common plane.

9. The device of claim 4, further including a pair of support arms disposed in diametrically opposed fashion and joined to said central web portion disposed therebetween.

10. The device of claim 3, wherein said housing includes a generlaly cylindrical portion, said core being translatable along the axis of said cylindrical portion.

11. The device of claim 10, wherein said cylindrical portion includes a first recess in one end thereof, an end cap received in said recess in sealing fashion, and one of said diaphragms received in said recess and clamped therein by said end cap.

12. The device of claim 11, wherein said cylindrical portion includes a second recess in the other end thereof, a second member having an end received in said second recess in sealing fashion, and the other of said diaphragms received in said second recess and clamped therein by said second member.

13. The device of claim 12, wherein said first member translates in slidable fashion within said second member.

14. The device of claim 12, further including stop means for limiting axial translation of said core and maintaining said core within said linear variable displacement transformer.

15. The device of claim 14, wherein said stop means includes a pair of stop members, each operatively secured to a respective end of said core and disposed to be limited in axial translation by impingement on said end cap or said second member, respectively.

16. The device of claim 13, wherein said means for releasably securing includes a releasable clamp operatively associated with said first and second members.

17. The device of claim 16, wherein said releasable clamp includes a threaded shaft extending through said second member and frictionally engaging said first member.

18. The device of claim 11, wherein said end cap includes an opening extending axially therethrough, and said second anchor means includes a post joined to said core and extending through said opening.

19. The device of claim 18, wherein said second anchor means further includes a universal joint assembly secured to the distal end of said post.

20. The device of claim 19, further including a flexible boot extending from said end cap to said universal joint assembly to seal said opening in said end cap.

21. The device of claim 19, further including an anchor in the other of said objects, a wire extending from said anchor to said device, and a wire retaining fitting joined to the distal end of said universal joint assembly to retain said wire.

* * * * *